United States Patent
Malchev et al.

(10) Patent No.: US 10,754,765 B2
(45) Date of Patent: Aug. 25, 2020

(54) OPERATING SYSTEM VALIDATION

(71) Applicant: Google LLC, Mountain View, CA (US)

(72) Inventors: Iliyan Batanov Malchev, San Francisco, CA (US); Keun Soo Yim, San Jose, CA (US)

(73) Assignee: Google LLC, Mountain View, CA (US)

( * ) Notice: Subject to any disclaimer, the term of this patent is extended or adjusted under 35 U.S.C. 154(b) by 270 days.

(21) Appl. No.: 15/840,484

(22) Filed: Dec. 13, 2017

(65) Prior Publication Data

US 2018/0336124 A1 Nov. 22, 2018

Related U.S. Application Data

(60) Provisional application No. 62/507,274, filed on May 17, 2017.

(51) Int. Cl.
*G06F 11/36* (2006.01)
*G06F 8/65* (2018.01)

(52) U.S. Cl.
CPC ...... *G06F 11/3692* (2013.01); *G06F 11/3672* (2013.01); *G06F 11/3684* (2013.01);
(Continued)

(58) Field of Classification Search
CPC ................... G06F 8/60; G06F 8/65–66; G06F 11/3664–3696
(Continued)

(56) References Cited

U.S. PATENT DOCUMENTS 5,867,710 A 2/1999 Dorris et al.

6,654,707 B2 11/2003 Wynn et al.
(Continued)

FOREIGN PATENT DOCUMENTS

WO WO 2006057515 6/2006

OTHER PUBLICATIONS

Chinetha, K., et al., An Evolution of Android Operating System and Its Version, International Journal of Engineering and Applied Sciences (IJEAS), vol. 2, Issue-2, Feb. 2015, pp. 30-33,[retrieved on Apr. 15, 2020], Retrieved from the Internet.*
(Continued)

*Primary Examiner* — Geoffrey R St Leger
(74) *Attorney, Agent, or Firm* — McDonnell Boehnen Hulbert & Berghoff LLP (57) ABSTRACT

Methods, systems, and apparatus, including computer programs encoded on a computer storage medium, for validating an operating system are disclosed. In one aspect, a method includes the actions of providing, to a computing device running an operating system that includes, a framework layer, a hardware abstraction layer, and a kernel that includes firmware and drivers, a reference system image that is configured to replace, supplement, or modify the framework layer. The actions further include providing, to the computing device, test data that is configured to verify functionality of the operating system by interacting with the reference system image to test functionality of the hardware abstraction layer without modifying the hardware abstraction layer, wherein the computing device with the framework layer replaced, supplemented, or modified by the reference system image is a non-rooted device. The actions further include determining whether the operating system of the computing device is functioning properly.

20 Claims, 3 Drawing Sheets

(52) U.S. Cl.
CPC ...... *G06F 11/3688* (2013.01); *G06F 11/3696* (2013.01); *G06F 8/65* (2013.01)

(58) Field of Classification Search
USPC .................................. 717/124–135, 168–173
See application file for complete search history.

(56) References Cited

U.S. PATENT DOCUMENTS

| | | | |
|---|---|---|---|
| 6,742,148 | B1 | 5/2004 | Korhonen |
| 7,278,059 | B2 | 10/2007 | Hughes |
| 8,346,870 | B2* | 1/2013 | Jazdzewski ......... G06F 11/3664 709/205 |
| 8,458,674 | B2* | 6/2013 | Barraclough ....... G06F 9/45516 717/131 |
| 9,916,079 | B2* | 3/2018 | Dietz .................... G06F 3/0488 |
| 2003/0074604 | A1* | 4/2003 | Mathias .............. G06F 11/3696 714/38.12 |
| 2004/0250243 | A1* | 12/2004 | Banerjee ............. G06F 11/3696 717/134 |
| 2005/0080584 | A1 | 4/2005 | Bonilla |
| 2006/0045019 | A1 | 3/2006 | Patzschke et al. |
| 2009/0125765 | A1* | 5/2009 | Lee ........................ H04L 63/20 714/724 |
| 2010/0205582 | A1 | 8/2010 | Liu |
| 2010/0229167 | A1 | 9/2010 | Dow et al. |
| 2010/0287562 | A1* | 11/2010 | Jazdzewski ......... G06F 11/3664 719/313 |
| 2012/0066548 | A1 | 3/2012 | Barker et al. |
| 2012/0174122 | A1 | 7/2012 | Kydles et al. |
| 2015/0378581 | A1* | 12/2015 | Dietz .................... G06F 3/0488 715/769 |
| 2017/0366562 | A1* | 12/2017 | Zhang .................... G06N 20/00 |
| 2018/0060221 | A1* | 3/2018 | Yim ........................ G06F 8/71 |

OTHER PUBLICATIONS

Kumail, I., Android Architecture : Learn How Android Works, AndroidClarified, Aug. 27, 2016, 8 pages, [retrieved on Apr. 15, 2020], Retrieved from the Internet.*
PCT International Search Report and Written Opinion issued in International Application No. PCT/US2018/028914, dated Jul. 24, 2018, 12 pages.

* cited by examiner

OPERATING SYSTEM VALIDATION

CROSS-REFERENCE TO RELATED APPLICATION

This application claims the benefit of U.S. Application No. 62/507,274, filed May 17, 2017, the contents of which are incorporated by reference.

FIELD

This specification relates to testing operating systems.

BACKGROUND

An operating system is system software that manages computer hardware and software resources and provides common services for computer programs. Computer programs require an operating system to function.

SUMMARY

A manufacturer of a computing device may modify different portions of an operating system that the manufacturer is installing on a computing device. However, the operating system must still retain particular functions in order to be compatible with many different types of user applications that may be developed by a wide assortment of developers that expect certain types of interaction with the operating system. As such, the manufacturer of the computing device may test the portions of the operating system that are exposed through application program interfaces (or other interfaces) by running some compatibility tests. Still, while these interfaces may be somewhat straightforward to test, it may be difficult to test the internal portions of the operating system that are less-easily accessed without sufficient permissions. Some operating systems are designed to prevent operation of the device in root mode in which all portions of the operating system are accessible and/or all operations may be performed. As such, it may be difficult to test portions of the operating system that are changed by a manufacturer (also called a vendor herein), but that fall within that difficult-to-test portion. Moreover, even if root access was available, there are benefits to testing the difficult-to-test portions of the operating system when the device is running in a mode that would be that used by a typical end user. In short, a different technique is needed to ensure that the operating system properly functions in an end user mode.

To test an end user build of the operating system on a computing device, a server may provide an image to load onto the computing device. The image may replace or supplement a particular portion of the operating system, such as one or more high layer portions of the operating system that are hardware agnostic. With the image having replaced or supplemented part of the operating system, the operating system remains bootable and dependencies between the lower level layers of the operating system are removed. The computing device may be able to receive test data from a remote device, and pass that test data to the image portion of the operating system that has replaced or supplemented portions of the operating system. The image may use the received test data to interact with and verify the functionality of the lower level layers of the operating system that may have been modified by the manufacturer but that may otherwise not be testable without root access. This testing may be performed without modifying portions of the lower layers. The computing device may generate reply data to having performed operations based on the content of the test data, and may send this reply data to the remote device. By analyzing the reply data, the remote device may verify whether or not the modified operating system is functioning properly, both in its exposed interfaces and in its internal portions that may not be directly testable through the exposed interfaces.

According to an innovative aspect of the subject matter described in this application, a method for operating system validation includes the actions of providing, to a computing device running an operating system that includes an application layer, a framework layer that includes native libraries, a hardware abstraction layer, and a kernel that includes firmware and drivers, a reference system image that is configured to replace, supplement, or modify the framework layer; providing, to the computing device with the framework layer replaced, supplemented, or modified by the reference system image, test data that is configured to verify functionality of the operating system by interacting with the reference system image to test functionality of the hardware abstraction layer without modifying the hardware abstraction layer, wherein the computing device with the framework layer replaced, supplemented, or modified by the reference system image is a non-rooted device; receiving, from the computing device with the framework layer replaced, supplemented, or modified by the reference system image, test reply data in response to the computing device testing the functionality of the hardware abstraction layer; comparing the test reply data to known test reply data that corresponds to a properly functioning computing device running the operating system; and based on the comparison, determining whether the operating system of the computing device with the framework layer replaced, supplemented, or modified by the reference system image is functioning properly.

These and other implementations can each optionally include one or more of the following features. The operating system further includes an interface layer that is configured to facilitate communication between the framework layer and the hardware abstraction layer. The test data is further configured to interact with the hardware abstraction layer. The hardware abstraction layer and the kernel define a vendor implementation layer that has been modified by a manufacturer of the computing device. The test data is configured to verify functionality of the operating system by interacting with the reference system image to test functionality of the hardware abstraction layer without modifying the vendor implementation layer. The operating system includes an implementation of SELinux. The actions further include providing, to the computing device with the framework layer replaced, supplemented, or modified by the reference system image, an instruction to place SELinux in permissive mode. The test data is provided to the computing device while the SELinux is in permissive mode. The reference system image is configured to remove dependencies that exist between the framework layer and the hardware abstraction layer. The reference system image is a user debug build. The hardware abstraction layer and the kernel are user builds. The action of providing, to the computing device with the framework layer replaced, supplemented, or modified by the reference system image, test data that is configured to verify functionality of the operating system by interacting with the reference system image to test functionality of the hardware abstraction layer without modifying the hardware abstraction layer includes providing an instruction to escalate a privilege level of a deamon that is running on the computing device and that receives the test data.

Other implementations of this aspect include corresponding systems, apparatus, and computer programs recorded on computer storage devices, each configured to perform the operations of the methods.

The subject matter described in this application may have one or more of the following advantages. A system may verify the functionality of an operating system while maintaining the security checks present in the operating system. The system is able to verify functionality of the exposed portions of the operating system as well as lower layer portions of the operating system that may not otherwise be exposed through interfaces.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

In the drawings, like reference numbers represent corresponding parts throughout.

DETAILED DESCRIPTION

Figure 1:
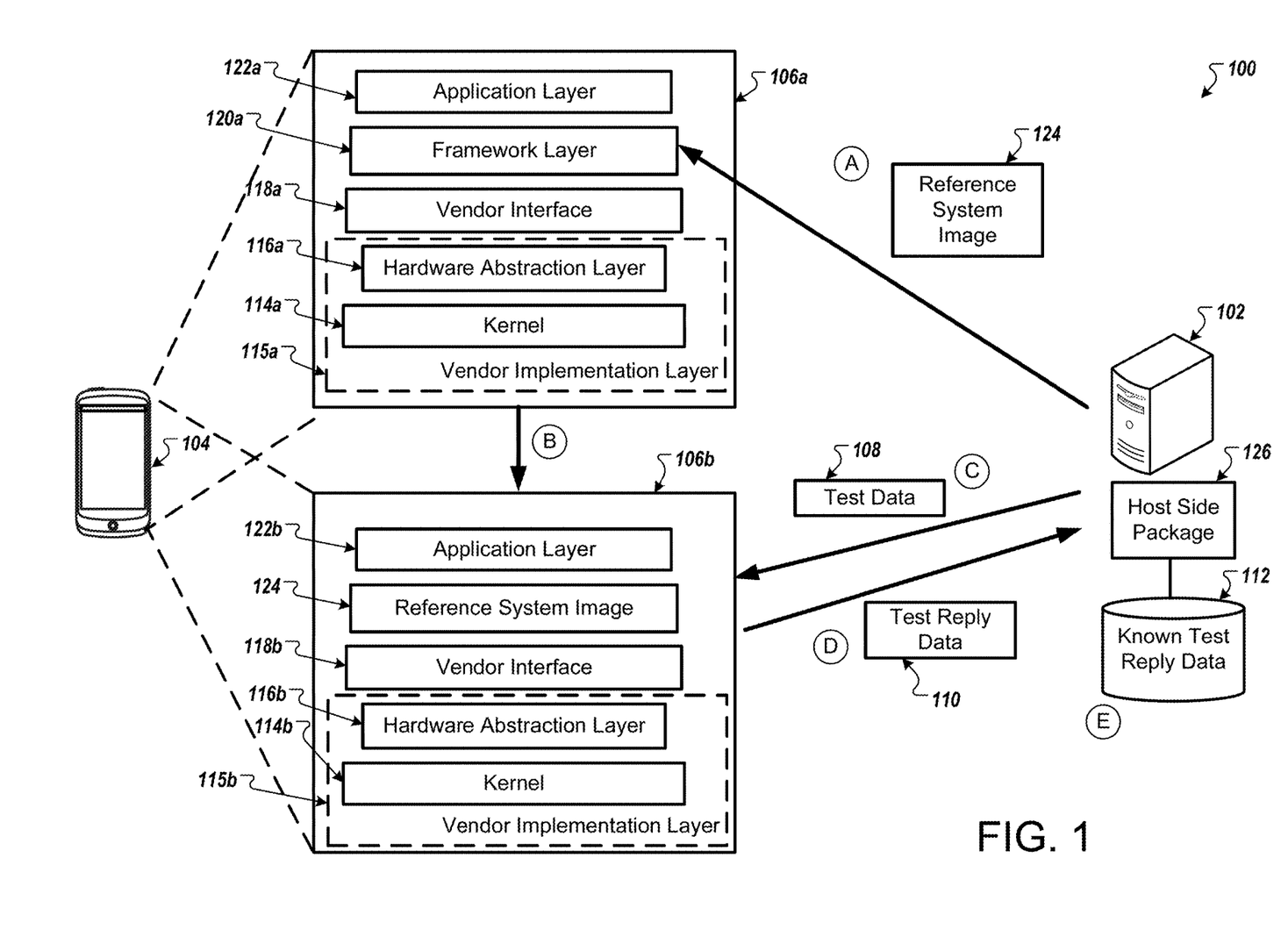
FIG. 1 illustrates an example system for validating an operating system.

FIG. 1 illustrates an example system 100 for validating an operating system. Briefly, and as described in more detail below, the server 102 validates the operating system that is running on computing device 104 (e.g., unmodified operating system 106a and modified operating system 106b). The server 102 modifies the operating system 106a and 106b and provides test data 108 to the computing device 104. The server 102 verifies the operation of the operating system 106a and 106b by comparing the test reply data 110 to known test reply data 112.

The computing device 104 may be any type of computing device that is capable of running an operating system. For example, the computing device 104 may be a mobile phone, laptop, desktop computer, tablet, watch, wearable device, smart speaker, smart appliance, or any other similar type of computing device. The computing device 104 may be manufactured by an entity that does not develop the operating system 106a and 106b. For example, Good Phone Maker, Tablet Maker, and Fun Phone Maker may each manufacture different versions of the computing device 104, and Software Company may manufacture the operating system 106a and 106b.

In order to ensure compatibility between the computing device 104 and the operating system 106a and 106b, the manufacturer of the computing device 104 may modify different portions of the operating system 104. For example, the manufacturer may modify portions of the operation system 106a and 106b that communicate with the specific hardware of the computing device 104, portions of the operation system 106a and 106b that are front facing user applications, and portions of the operations system 106a and 106b in between the hardware and the user applications.

The manufacturer of the computing device 104 also ensures that the operating system 106a and 106b complies with the requirements of the operating system 106a and 106b as set forth by the developer of the operating system 106a and 106b. For example, the developer of the operating system 106a and 106b may require that the operating system 106a and 106b be able to run a specific messaging application. This particular messaging application should be able to run on any computing device 104 that is running the operating system 106a and 106b independent of the modifications made to the operating system 106a and 106b by the manufacturer.

Testing to ensure that each modified version of the operating system 106a and 106b is operating correctly may be challenging. One complication is based on a security requirement that the operating system 106a and 106b not be rootable. In other words, a user may not be able to boot the device and gain root access (e.g., the user may be prevented from accessing and modifying critical system files or an unauthorized user may be prevented from accessing sensitive or private user data). The operating system 106a and 106b may be specifically designed like this to ensure the protection and privacy of user data. If the operating system 106a and 106b is not rooted, it is difficult to run a complete test suite because the test suite may only be able to access particular portions of the operating system 106a and 106b that are specified by the security permissions.

To counteract this problem, the server 102 that runs the test suite may modify a portion of the operating system 106a and 106b. This modified portion may be configured to communicate with and verify the functionality of those internal portions of the operating system 106a and 106b that may not be accessible without rooting the device. The modified portion should be bootable to a mode that would be used by a typical end user. In other words, a test suite should be able to run both a compatibility test suite that is configured to test the API that is exposed for use by applications as well as a vendor test suite (e.g., a manufacturer test suite). The vendor test suite may include a set of operations and/or data that is configured to test the internal components of the operating system 106a and 106b to ensure compatibility of the internal components of the operating system 106a and 106b since they may not be otherwise testable through outward-facing interfaces. As noted above, the internal components of the operating system 106a and 106b may be modified by the manufacturer of the computing device 104.

As illustrated in FIG. 1, the operating system 106a includes five different layers. The operating system 106a represents a final user build. In other words, operating system 106a is ready and configured to be provided to an end user. This is the version of the operating system that should be verified.

In some implementations, the operating system 106a may be an update to an existing operating system that is already on a computing device operated by an end user. In this case, the operating system 106a may be loaded onto a computing device that is similar to the computing device operated by the end user. The server 102 may then verify the operation of the operating system 106a running on the similar computing device. The manufacturer of the computing device 104 or the service provider may then push an updated version of the verified operating system 106a.

The layers of the operating system 106a include a kernel 114a, a hardware abstraction layer 116a, a vendor interface 118a, a framework layer 120a, and an application layer 122a. The kernel 114a is the core of the operating system 106a. The kernel 114a may be the first program that the boot process loads into the memory. The kernel 114a may handle the remaining boot process. The kernel 114a interacts with the CPU, memory, and other hardware of the computing device 104. The kernel 114a includes power management features to manage battery power on the computing device 104. The kernel 114a includes drivers to communicate with various hardware devices such as audio drivers, display drivers, Bluetooth drivers, USB drivers, camera drivers, WiFi drivers, and other similar drivers.

Another layer of the operating system 106a is the hardware abstraction layer 116a. The hardware abstraction layer (HAL) 116a provides standard interfaces that expose device hardware capabilities to the upper layers of the operating system 106a, for example, one or more APIs in the framework layer 120a. The HAL 116a consists of multiple library modules, each of which implements an interface for a specific type of hardware component, such as the camera or Bluetooth module. When a call is made to access device hardware through an API in the framework layer 120a, the operating system 106a loads the library module for that hardware component. In some implementations, the manufacturer of the operating system 106a may modify the HAL 116a to ensure that the HAL 116a operates properly with the kernel 114a and the drivers. The drivers may be different for each version of the computing device 104 from different manufacturers, and hence, the HAL 116a should be modified to communicate properly with the kernel 114a and the drivers.

Another layer of the operating system 106a is the framework layer 120a. The framework layer 120a may be agnostic to the hardware of the computing device 104. In other words, the framework layer 120a operates the same way independent of the hardware of the computing device 104. The manufacturer of the computing device 104 may still modify the framework layer 120, but the modifications may not be based on ensuring compatibility with the hardware of the computing device 104. The framework layer 120a includes native libraries and an API framework (e.g., a Java API framework) to expose the functionality of the native libraries to the application layer 122a. The API framework includes the building blocks needed to develop applications for the operating system 104a.

Another layer of the operating system 106a is the vendor interface 118a. The vendor interface 118a is a boundary between the hardware agnostic framework layer 120a and the hardware specific hardware abstraction layer 116a. The vendor interface 118a is configured to facilitate communication between the framework layer 120a and the hardware abstraction layer 116a. In some implementations, the vendor interface 118a encapsulates a collection of versioned hardware abstraction layer interfaces, kernel interfaces exposed to the user space, and other components that may be segregated by ownership. In some implementations, the vendor interface 118a includes an API to expose functionality of the hardware abstraction layer 116a to the framework layer 120a.

Another layer of the operating system 106a is the application layer 122a. The application layer 122a includes user applications included with the operating system 106a and user applications added by the manufacturer of the computing device 104. For example, the application layer 122a may include a messaging application, an email application, a calendar application, a photo management application, a browser, and other similar applications. The applications may communicate with the framework layer 120a through an exposed API.

The hardware abstraction layer 116a and the kernel 114a may define a vendor implementations layer 115a. The vendor implementation layer 115a may be modified by a manufacturer of the computing device 104. In some implementations, some kernel 114a APIs are exposed directly to the framework layer 120a. In some implementations, some kernel 114a APIs are exposed through the hardware abstraction layer 116. The exposed APIs form the APIs of the vendor implementation layer 115a.

To ensure the functionality of the operating system 106a, the system 100 performs the stages marked A-E in FIG. 1. In stage A, the server 102 provides the reference system image 124 to the computing device 104. The reference system image 124 may include instructions to overwrite the framework layer 120a or to augment the framework layer 120a. The reference system image 124 is a layer that is a user debug build. In some implementations, the reference system image 124 escalates the privilege level of a deamon that is in the operating system 106a and that accepts a command from the server 102. In some implementations, the reference system image 124 may change the security-enhanced portion of the operating system 106a (e.g., SELinux) to be in permissive mode. In permissive mode, security violations that are not typically allowed may be allowed. In some implementations, it may not be necessary to change the security-enhanced portion of the operating system 106a because test data 108 may have escalated privileges that gives the test data the ability to communicate directly with the vendor interface layer 118a while preserving the rules of the security-enhanced portion of the operating system 106a. In instances where the security-enhanced portion of the operating system is not changed, the server may user a debug bridge or substitute user (e.g., su) command to preserve the security checks while still performing the necessary testing.

In stage B, the computing device 104 loads the reference system image 124. In some implementations, the computing device 104 replaces the framework layer 120a with the reference system image 124. In some implementations, the computing device 104 adds the reference system image 124 to the framework layer 120a. The resulting operating system 106b is similar to the operating system 106a. The operating system 106b is bootable. The operating system 106b includes the kernel 114b, which is similar to or same as kernel 114a. The operating system 106b includes the vendor interface 118b, which is similar to or same as vendor interface 118a. The operating system 106b includes the hardware abstraction layer 116b, which is similar to or same as hardware abstraction layer 116a. The operating system 106b includes the application layer 122b, which is similar to or same as application layer 122a. The vendor implementation layer 115b may be defined as the hardware abreaction layer 116b and the kernel 114b.

In some implementations, the rules of the security-enhanced portion of the operating system 106b may be mismatched with the rules in the reference system image 124 such that the computing device 104 does not boot properly. In this case, the boot failure may be due to some unnecessary dependencies in the reference system image 124 or the vendor interface layer 118b. The server 102 may perform an extra diagnosis to identify the layer with the error. In some implementations, the server 102 may check the serial log of the computing device 104 and compare the serial log to known error to resolve the problem.

In some implementations, the reference system image 124 has no direct dependency on hardware abstraction layer 116b. In particular, the reference system image 124 has no direct dependency on the portion of the hardware abstraction layer 116b modified by the manufacturer of the computing device 104. In some implementations, the reference system image 124 is compliant with the vendor interface 118b. In some implementations, the reference system image 124 is for testing. However, the reference system image 124 may be used in normal operation by an end user.

In stage C, the server 102 executes a testing procedure of the host side package 126. The host side package 126 includes instructions for providing test data 108 to the computing device 104 and comparing the test reply data 110 received from the computing device to known test reply data 112. The server 102 sends test data 108 to the computing device 104. In some implementations, the test data 108 may include two parts. The first part of the test data includes compatibility test data that tests the exposed API of the operating system 106b. The server 102 may provide the compatibility test data to the operating system 106a or 106b to determine whether the exposed API is functioning properly. The second part of the test data includes vendor test data. This server 102 may provide the vendor test data to test the functionality of the vendor interface layer 118b and the hardware abstraction layer 116b. The vendor test data may have escalated privileges to communicate with the vendor interface layer 118b. Thus, when combined with the reference system image 124, the vendor test data with the escalated privileges may test the functionality of the hardware abstraction layer 116b. Without the reference system image, the vendor test data may not be able to test the functionality of the hardware abstraction layer 116b because of security restrictions.

The operating system 106b receives the test data 108 in stage C, executes the test data 108, and then returns test reply data 110 in stage D. The test reply data 110 includes data generated by the layers of operating system 106b upon execution of the test data 108. The test reply data 110 may include test reply data for the compatibility test data and the vendor test data.

In stage E, the server 102 compares the received test reply data 110 to the known test reply data 112. The known test reply data 112 includes reply data for computing devices with functioning and validated operating systems. In some implementations, the known test reply data 112 may include samples of reply data for computing devices without functioning and validated operating systems. The host side package 126 includes instructions for comparing the test reply data 110. Based on the comparison, the server 102 determines whether the operating system 106b is valid and functional. The server 102 may repeat the process on a different computing device running a different operating system.

Figure 2:
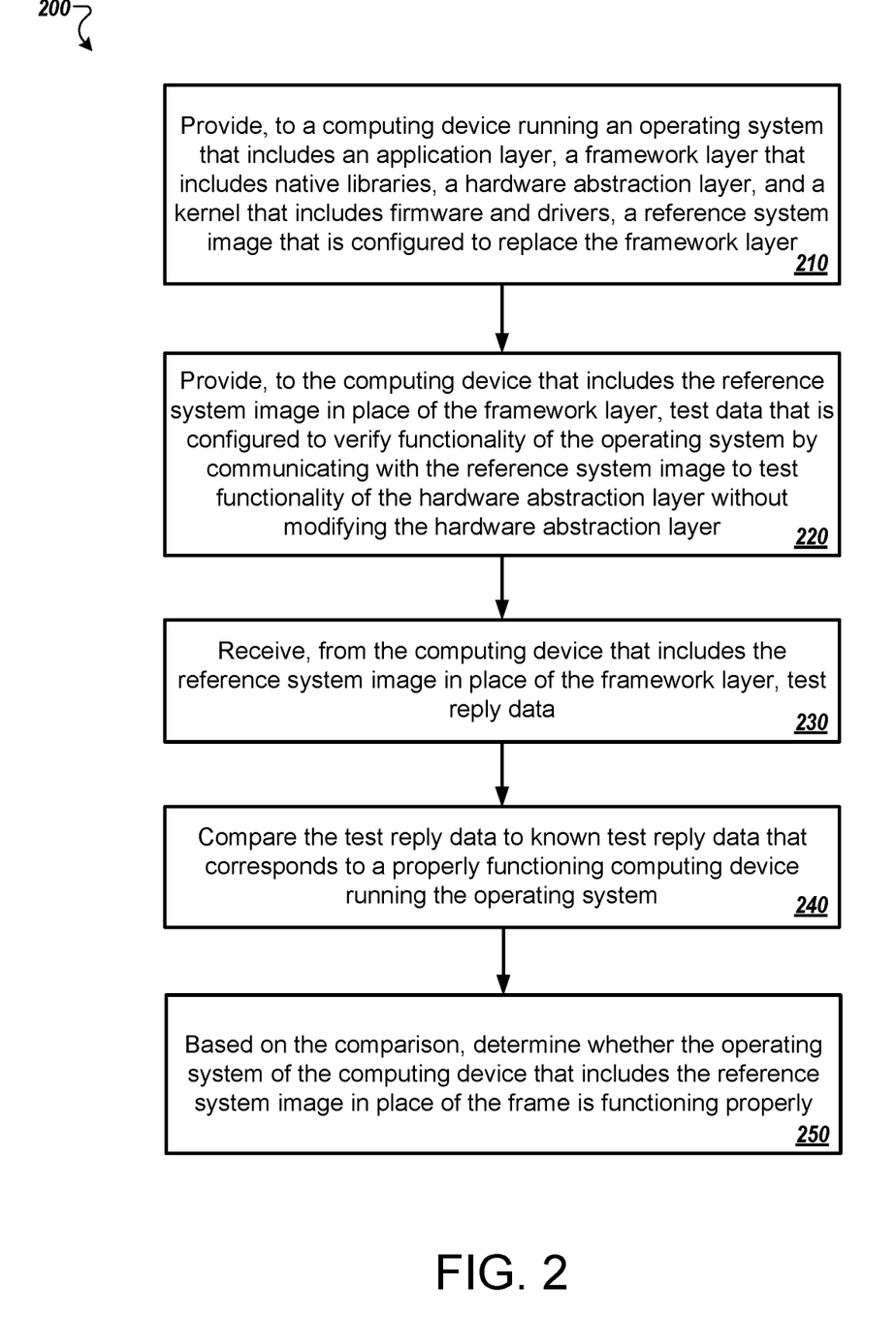
FIG. 2 illustrates an example process for validating an operating system.

FIG. 2 illustrates an example process 200 for validating an operating system. In general, the process 200 validates an operating system by modifying a portion of the operating system to communicate with other portions of the operating system that may not have been accessible without modification. The process 200 will be described as being performed by a computer system comprising one or more computers, for example, server 102 as shown in FIG. 1.

The system provides, to a computing device running an operating system that includes an application layer, a framework layer that includes native libraries, a hardware abstraction layer, and a kernel that includes firmware and drivers, a reference system image that is configured to replace the framework layer (210). Each of these layers may be similar to or same as the layers of operating system 106a. In some implementations, the operating system includes an interface layer that is configured to facilitate communication between the framework layer and the hardware abstraction layer. In some implementations, a manufacturer, or vendor, of the computing device may modify one or more of these layers. For example, the manufacturer may modify the hardware abstraction layer to be compatible with the hardware of the computing device. This modification may include modifying or adding a target vendor implementation portion to the hardware abstraction layer.

The system provides, to the computing device that includes the reference system image that has either replaced or supplemented the framework layer, test data. That test data is configured to verify functionality of the operating system by communicating with the reference system image to test functionality of the hardware abstraction layer without modifying the hardware abstraction layer (220). In some implementations, the test data is configured to verify functionality of the operating system by communicating with the reference system image to test functionality of the hardware abstraction layer without modifying the target vendor implementation (e.g., which may include a portion of the hardware abstraction layer). In this instance, the target vendor implementation may have been originally modified by a manufacturer of the computing device.

In some implementations, the operating system may include a security enhanced portion, e.g. SELinux. The system may provide an instruction to the computing device to place the security enhanced portion in permissive mode. In permissive mode, the operating system may allow violations that it may not normally allow outside of permissive mode. With the security enhanced portion in permissive mode, the system may provide the test data to the computing device.

In some implementations, the computing device is non-rootable. In other words, the computing device not be able to boot with root level permissions. The computing device may only be able to boot with end user permissions. This may be for the protection and privacy-preservation of user data. Moreover, it is beneficial for testing to be performed on an end user build of the operating system to be done in user mode to replicate real-world user experiences. In some implementations, the reference system is a user debug build. In other words, with the reference system image, the computing device may exhibit debugging capabilities while booting in end user mode, such that certain parameters may be viewed or recorded by a tester.

In some implementations, the system provides an instruction to escalate a privilege level of a deamon that is running on the computing device and that receives the test data. The system may provide this instruction instead of providing an instruction to the computing device to place the security enhanced portion in permissive mode. In some implementations, the reference system image may allow debugging specifically from the system.

In some implementations, the test data includes compatibility test data to test the exposed API, and includes vendor test data to test the vendor interface and the hardware abstraction layer. Without the reference system image, the system may have difficulty performing the test with the vendor test data with a user build computing device (or may not be able to perform the test at all). The reference system image is configured to remove dependencies that exist between the framework layer and the hardware abstraction layer.

The system receives, from the computing device that includes the reference system image in place of the framework layer, test reply data (230). The test reply data may include reply data for the compatibility test and the vendor test. The system compares the test reply data to known test reply data that corresponds to data received from a properly functioning computing device running the operating system (240). The known test reply data may include reply data that corresponds to a functioning and verified operating system, as well as samples of reply data that correspond to a non-functioning and/or non-verified operating system. The system can, based on the comparison, determine whether the operating system of the computing device that includes the reference system image in place of the framework layer is functioning properly (250).

Figure 3:
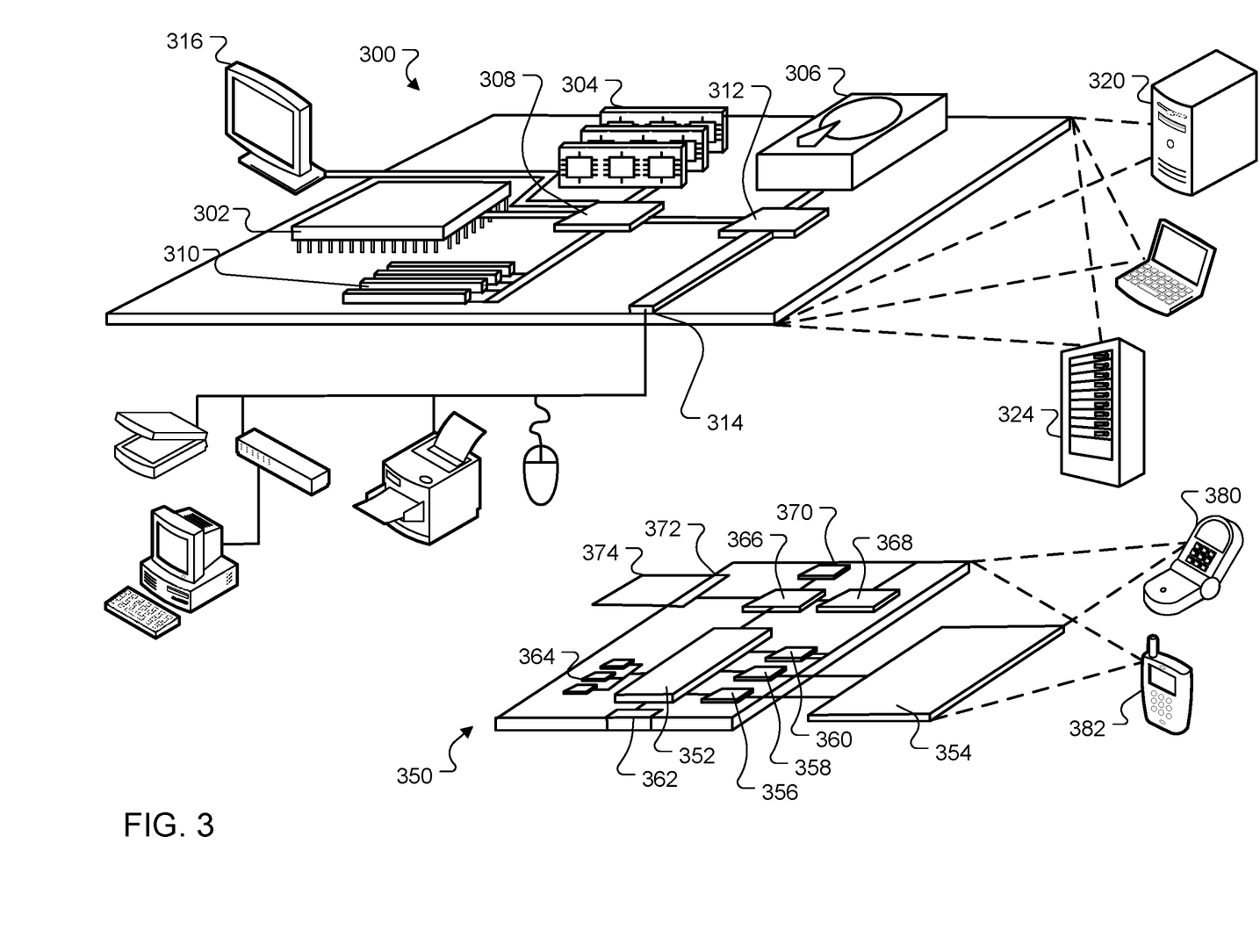
FIG. 3 illustrates an example of a computing device and a mobile computing device.

FIG. 3 shows an example of a computing device 300 and a mobile computing device 350 that can be used to implement the techniques described here. The computing device 300 is intended to represent various forms of digital computers, such as laptops, desktops, workstations, personal digital assistants, servers, blade servers, mainframes, and other appropriate computers. The mobile computing device 350 is intended to represent various forms of mobile devices, such as personal digital assistants, cellular telephones, smart-phones, and other similar computing devices. The components shown here, their connections and relationships, and their functions, are meant to be examples only, and are not meant to be limiting.

The computing device 300 includes a processor 302, a memory 304, a storage device 306, a high-speed interface 308 connecting to the memory 304 and multiple high-speed expansion ports 310, and a low-speed interface 312 connecting to a low-speed expansion port 314 and the storage device 306. Each of the processor 302, the memory 304, the storage device 306, the high-speed interface 308, the high-speed expansion ports 310, and the low-speed interface 312, are interconnected using various busses, and may be mounted on a common motherboard or in other manners as appropriate. The processor 302 can process instructions for execution within the computing device 300, including instructions stored in the memory 304 or on the storage device 306 to display graphical information for a GUI on an external input/output device, such as a display 316 coupled to the high-speed interface 308. In other implementations, multiple processors and/or multiple buses may be used, as appropriate, along with multiple memories and types of memory. Also, multiple computing devices may be connected, with each device providing portions of the necessary operations (e.g., as a server bank, a group of blade servers, or a multi-processor system).

The memory 304 stores information within the computing device 300. In some implementations, the memory 304 is a volatile memory unit or units. In some implementations, the memory 304 is a non-volatile memory unit or units. The memory 304 may also be another form of computer-readable medium, such as a magnetic or optical disk.

The storage device 306 is capable of providing mass storage for the computing device 300. In some implementations, the storage device 306 may be or contain a computer-readable medium, such as a floppy disk device, a hard disk device, an optical disk device, or a tape device, a flash memory or other similar solid state memory device, or an array of devices, including devices in a storage area network or other configurations. Instructions can be stored in an information carrier. The instructions, when executed by one or more processing devices (for example, processor 302), perform one or more methods, such as those described above. The instructions can also be stored by one or more storage devices such as computer- or machine-readable mediums (for example, the memory 304, the storage device 306, or memory on the processor 302).

The high-speed interface 308 manages bandwidth-intensive operations for the computing device 300, while the low-speed interface 312 manages lower bandwidth-intensive operations. Such allocation of functions is an example only. In some implementations, the high-speed interface 308 is coupled to the memory 304, the display 316 (e.g., through a graphics processor or accelerator), and to the high-speed expansion ports 310, which may accept various expansion cards. In the implementation, the low-speed interface 312 is coupled to the storage device 306 and the low-speed expansion port 314. The low-speed expansion port 314, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 300 may be implemented in a number of different forms, as shown in the figure. For example, it may be implemented as a standard server 320, or multiple times in a group of such servers. In addition, it may be implemented in a personal computer such as a laptop computer 322. It may also be implemented as part of a rack server system 324. Alternatively, components from the computing device 300 may be combined with other components in a mobile device, such as a mobile computing device 350. Each of such devices may contain one or more of the computing device 300 and the mobile computing device 350, and an entire system may be made up of multiple computing devices communicating with each other.

The mobile computing device 350 includes a processor 352, a memory 364, an input/output device such as a display 354, a communication interface 366, and a transceiver 368, among other components. The mobile computing device 350 may also be provided with a storage device, such as a micro-drive or other device, to provide additional storage. Each of the processor 352, the memory 364, the display 354, the communication interface 366, and the transceiver 368, are interconnected using various buses, and several of the components may be mounted on a common motherboard or in other manners as appropriate.

The processor 352 can execute instructions within the mobile computing device 350, including instructions stored in the memory 364. The processor 352 may be implemented as a chipset of chips that include separate and multiple analog and digital processors. The processor 352 may provide, for example, for coordination of the other components of the mobile computing device 350, such as control of user interfaces, applications run by the mobile computing device 350, and wireless communication by the mobile computing device 350.

The processor 352 may communicate with a user through a control interface 358 and a display interface 356 coupled to the display 354. The display 354 may be, for example, a TFT (Thin-Film-Transistor Liquid Crystal Display) display or an OLED (Organic Light Emitting Diode) display, or other appropriate display technology. The display interface 356 may comprise appropriate circuitry for driving the display 354 to present graphical and other information to a user. The control interface 358 may receive commands from a user and convert them for submission to the processor 352. In addition, an external interface 362 may provide communication with the processor 352, so as to enable near area communication of the mobile computing device 350 with other devices. The external interface 362 may provide, for example, for wired communication in some implementations, or for wireless communication in other implementations, and multiple interfaces may also be used.

The memory 364 stores information within the mobile computing device 350. The memory 364 can be implemented as one or more of a computer-readable medium or media, a volatile memory unit or units, or a non-volatile memory unit or units. An expansion memory 374 may also be provided and connected to the mobile computing device 350 through an expansion interface 372, which may include, for example, a SIMM (Single In Line Memory Module) card interface. The expansion memory 374 may provide extra storage space for the mobile computing device 350, or may also store applications or other information for the mobile computing device 350. Specifically, the expansion memory 374 may include instructions to carry out or supplement the processes described above, and may include secure information also. Thus, for example, the expansion memory 374 may be provided as a security module for the mobile computing device 350, and may be programmed with instructions that permit secure use of the mobile computing device 350. In addition, secure applications may be provided via the SIMM cards, along with additional information, such as placing identifying information on the SIMM card in a non-hackable manner.

The memory may include, for example, flash memory and/or NVRAM memory (non-volatile random access memory), as discussed below. In some implementations, instructions are stored in an information carrier. that the instructions, when executed by one or more processing devices (for example, processor 352), perform one or more methods, such as those described above. The instructions can also be stored by one or more storage devices, such as one or more computer- or machine-readable mediums (for example, the memory 364, the expansion memory 374, or memory on the processor 352). In some implementations, the instructions can be received in a propagated signal, for example, over the transceiver 368 or the external interface 362.

The mobile computing device 350 may communicate wirelessly through the communication interface 366, which may include digital signal processing circuitry where necessary. The communication interface 366 may provide for communications under various modes or protocols, such as GSM voice calls (Global System for Mobile communications), SMS (Short Message Service), EMS (Enhanced Messaging Service), or MMS messaging (Multimedia Messaging Service), CDMA (code division multiple access), TDMA (time division multiple access), PDC (Personal Digital Cellular), WCDMA (Wideband Code Division Multiple Access), CDMA2000, or GPRS (General Packet Radio Service), among others. Such communication may occur, for example, through the transceiver 368 using a radio-frequency. In addition, short-range communication may occur, such as using a Bluetooth, WiFi, or other such transceiver. In addition, a GPS (Global Positioning System) receiver module 370 may provide additional navigation- and location-related wireless data to the mobile computing device 350, which may be used as appropriate by applications running on the mobile computing device 350.

The mobile computing device 350 may also communicate audibly using an audio codec 360, which may receive spoken information from a user and convert it to usable digital information. The audio codec 360 may likewise generate audible sound for a user, such as through a speaker, e.g., in a handset of the mobile computing device 350. Such sound may include sound from voice telephone calls, may include recorded sound (e.g., voice messages, music files, etc.) and may also include sound generated by applications operating on the mobile computing device 350.

The mobile computing device 350 may be implemented in a number of different forms, as shown in the figure. For example, it may be implemented as a cellular telephone 380. It may also be implemented as part of a smart-phone 382, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms machine-readable medium and computer-readable medium refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term machine-readable signal refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network (LAN), a wide area network (WAN), and the Internet.

The computing system can include clients and servers. A client and server are generally remote from each other and typically interact through a communication network. The relationship of client and server arises by virtue of computer programs running on the respective computers and having a client-server relationship to each other.

Although a few implementations have been described in detail above, other modifications are possible. For example, while a client application is described as accessing the delegate(s), in other implementations the delegate(s) may be employed by other applications implemented by one or more processors, such as an application executing on one or more servers. In addition, the logic flows depicted in the figures do not require the particular order shown, or sequential order, to achieve desirable results. In addition, other actions may be provided, or actions may be eliminated, from the described flows, and other components may be added to, or removed from, the described systems. Accordingly, other implementations are within the scope of the following claims.

What is claimed is:

1. A computer-implemented method comprising:
providing, to a computing device running an operating system that includes an application layer, a framework layer that includes native libraries, a hardware abstraction layer, and a kernel that includes firmware and drivers, a reference system image that is configured to replace, supplement, or modify the framework layer, wherein the hardware abstraction layer and the kernel define a vendor implementation layer that has been modified by a manufacturer of the computing device;
providing, to the computing device with the framework layer replaced, supplemented, or modified by the reference system image, test data that is configured to verify functionality of the operating system by interacting with the reference system image to test functionality of the hardware abstraction layer without modifying the vendor implementation layer, wherein the computing device with the framework layer replaced, supplemented, or modified by the reference system image is a non-rooted device;
receiving, from the computing device with the framework layer replaced, supplemented, or modified by the reference system image, test reply data in response to the computing device testing the functionality of the hardware abstraction layer;
comparing the test reply data to known test reply data that corresponds to a properly functioning computing device running the operating system; and
based on the comparison, determining whether the operating system of the computing device with the framework layer replaced, supplemented, or modified by the reference system image is functioning properly.

2. The method of claim 1, wherein the operating system further includes an interface layer that is configured to facilitate communication between the framework layer and the hardware abstraction layer.

3. The method of claim 1, wherein the test data is further configured to interact with the hardware abstraction layer.

4. The method of claim 1, wherein:
the operating system includes an implementation of SELinux,
the method further comprises providing, to the computing device with the framework layer replaced, supplemented, or modified by the reference system image, an instruction to place the implementation of SELinux in permissive mode, and
the test data is provided to the computing device while the implementation of SELinux is in permissive mode.

5. The method of claim 1, wherein the reference system image is configured to remove dependencies that exist between the framework layer and the hardware abstraction layer.

6. The method of claim 1, wherein:
the reference system image is a user debug build, and
the hardware abstraction layer and the kernel are user builds.

7. The method of claim 1, wherein providing, to the computing device with the framework layer replaced, supplemented, or modified by the reference system image, test data that is configured to verify functionality of the operating system by interacting with the reference system image to test functionality of the hardware abstraction layer without modifying the vendor implementation layer comprises:
providing an instruction to escalate a privilege level of a daemon that is running on the computing device and that receives the test data.

8. A system comprising:
one or more computers; and
one or more storage devices storing instructions that are operable, when executed by the one or more computers, to cause the one or more computers to perform operations comprising:
providing, to a computing device running an operating system that includes an application layer, a framework layer that includes native libraries, a hardware abstraction layer, and a kernel that includes firmware and drivers, a reference system image that is configured to replace, supplement, or modify the framework layer, wherein the hardware abstraction layer and the kernel define a vendor implementation layer that has been modified by a manufacturer of the computing device;
providing, to the computing device with the framework layer replaced, supplemented, or modified by the reference system image, test data that is configured to verify functionality of the operating system by interacting with the reference system image to test functionality of the hardware abstraction layer without modifying the vendor implementation layer, wherein the computing device with the framework layer replaced, supplemented, or modified by the reference system image is a non-rooted device;
receiving, from the computing device with the framework layer replaced, supplemented, or modified by the reference system image, test reply data in response to the computing device testing the functionality of the hardware abstraction layer;
comparing the test reply data to known test reply data that corresponds to a properly functioning computing device running the operating system; and
based on the comparison, determining whether the operating system of the computing device with the framework layer replaced, supplemented, or modified by the reference system image is functioning properly.

9. The system of claim 8, wherein the operating system further includes an interface layer that is configured to facilitate communication between the framework layer and the hardware abstraction layer.

10. The system of claim 8, wherein the test data is further configured to interact with the hardware abstraction layer.

11. The system of claim 8, wherein:
the operating system includes an implementation of SELinux,
the operations further comprise providing, to the computing device with the framework layer replaced, supplemented, or modified by the reference system image, an instruction to place the implementation of SELinux in permissive mode, and
the test data is provided to the computing device while the implementation of SELinux is in permissive mode.

12. The system of claim 8, wherein the reference system image is configured to remove dependencies that exist between the framework layer and the hardware abstraction layer.

13. The system of claim 8, wherein:
the reference system image is a user debug build, and
the hardware abstraction layer and the kernel are user builds.

14. The system of claim 8, wherein providing, to the computing device with the framework layer replaced, supplemented, or modified by the reference system image, test data that is configured to verify functionality of the operating system by interacting with the reference system image to test functionality of the hardware abstraction layer without modifying the vendor implementation layer comprises:
providing an instruction to escalate a privilege level of a deamon that is running on the computing device and that receives the test data.

15. A non-transitory computer-readable medium storing software comprising instructions executable by one or more computers which, upon such execution, cause the one or more computers to perform operations comprising:
providing, to a computing device running an operating system that includes an application layer, a framework layer that includes native libraries, a hardware abstraction layer, and a kernel that includes firmware and drivers, a reference system image that is configured to replace, supplement, or modify the framework layer, wherein the hardware abstraction layer and the kernel define a vendor implementation layer that has been modified by a manufacturer of the computing device;
providing, to the computing device with the framework layer replaced, supplemented, or modified by the reference system image, test data that is configured to verify functionality of the operating system by interacting with the reference system image to test functionality of the hardware abstraction layer without modifying the vendor implementation layer, wherein the computing device with the framework layer replaced, supplemented, or modified by the reference system image is a non-rooted device;
receiving, from the computing device with the framework layer replaced, supplemented, or modified by the reference system image, test reply data in response to the computing device testing the functionality of the hardware abstraction layer;
comparing the test reply data to known test reply data that corresponds to a properly functioning computing device running the operating system; and
based on the comparison, determining whether the operating system of the computing device with the framework layer replaced, supplemented, or modified by the reference system image is functioning properly.

16. The medium of claim 15, wherein the operating system further includes an interface layer that is configured to facilitate communication between the framework layer and the hardware abstraction layer.

17. The medium of claim 15, wherein the test data is further configured to interact with the hardware abstraction layer.

18. The medium of claim 15, wherein:
the operating system includes an implementation of SELinux,
the operations further comprise providing, to the computing device with the framework layer replaced, supplemented, or modified by the reference system image, an instruction to place the implementation of SELinux in permissive mode, and
the test data is provided to the computing device while the implementation of SELinux is in permissive mode.

19. The medium of claim 15, wherein the reference system image is configured to remove dependencies that exist between the framework layer and the hardware abstraction layer.

20. The medium of claim 15, wherein providing, to the computing device with the framework layer replaced, supplemented, or modified by the reference system image, test data that is configured to verify functionality of the operating system by interacting with the reference system image to test functionality of the hardware abstraction layer without modifying the vendor implementation layer comprises:
providing an instruction to escalate a privilege level of a deamon that is running on the computing device and that receives the test data.

* * * * *